INVENTORS
GERALD J. MICHON
HUBERT K. BURKE

BY Walter C. Bernkopf

THEIR ATTORNEY

100 # United States Patent Office 3,444,454
Patented May 13, 1969

3,444,454
FUNCTION GENERATOR UTILIZING LINEAR AND SATURABLE CORE TRANSFORMERS
Hubert K. Burke, Schenectady, and Gerald J. Michon, Waterford, N.Y., assignors to General Electric Company, a corporation of New York
Filed Dec. 29, 1966, Ser. No. 605,742
Int. Cl. H02p 13/14, 13/16
U.S. Cl. 321—16                10 Claims

ABSTRACT OF THE DISCLOSURE

An A-C signal is applied to the primary windings of a linear and a saturable core transformer. The secondary winding outputs of both transformers are summed to provide the desired output signal, which signal may be rectified and filtered to provide a D-C output. The linear transformer provides an output varying linearly with an increase in A-C amplitude and the saturable transformer provides an output which varies linearly and, subsequent to reaching saturation, remains substantially constant.

---

Figure 1:
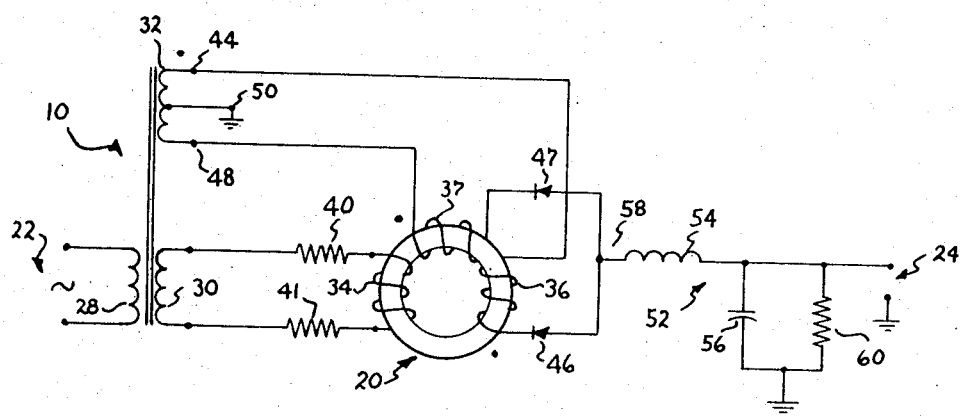

This invention relates to a new and improved circuit for generating electrical energy of a preselected function from an applied alternating current signal and more particularly to such a circuit wherein any of the commonly expected failure modes of the circuit or portions thereof results in a reduction in the value of the output. That is, the function is generated in a manner often termed "fail-safe."

While a wide variety of function generators employing various circuit arrangements are known and used in the art the arrangement of the present invention provides for the converting of an alternating current input signal to a preselected function in an inherently simpler and more "fail-safe" manner than any other arrangement of which we are aware.

Although the function generator of this invention is subject to a wide variety of different applications, it is especially useful for incorporation in automatic control systems for vehicles where the "fail-safe" characteristic is of such vital importance and it will be particularly described in that connection. For example, the function generator of this invention may be utilized to advantage in the automatic vehicle control systems described in the patent applications of Wells, Ser. No. 518,171 filed Jan. 3, 1966 and Burke et al., Ser. No. 605,742, filed concurrently herewith, both of which are entitled "Automatic Control System for Vehicles Incorporating a Ranging System for Vehicle Traffic Safety Control" and both of which require a function generator means for converting a range signal into a maximum permissible vehicle velocity signal for the range. That is, for a given range the vehicle should not exceed a specified velocity and the function generator is utilized to produce a suitable range distance-velocity control trajectory function with which the actual vehicle velocity may be compared. Since the signal proportional to the actual velocity of the vehicle, as usually derived, is of different character than the signal available from the ranging system, direct comparison of the signals is not often practicable. Accordingly, comparison is most conveniently provided on a direct current basis. Thus, the output of the function generator may conveniently be provided as a unidirectional voltage signal whose magnitude is proportional to the minimum vehicle velocity that would result in full braking effort being applied to the vehicle for the particular range. It will be understood that for any particular application the actual parameters of the function generator will be determined by the stopping trajectory required and the dynamics of the system.

It will be appreciated from the titles of these applications alone that the reliability and "fail-safe" mode of operation of the function generator is of extreme importance since such function generator is associated with the traffic safety function of the system.

It is an object of this invention to provide a function generator which employs static electrical components and is inherently both reliable and "fail-safe."

It is another object of this invention to provide a function generator which requires no mechanical parts or active circuit elements and one which is inherently more reliable, simple and "fail-safe" than any other arrangements of which we are aware.

Briefly stated, in accordance with one aspect of this invention, the function generator comprises the combination of a linear transformer means and a saturable core transformer means. The two different transformer means are arranged so that both are energized to produce their respective outputs in response to an applied alternating current signal. Means are provided for summing the output of the linear transformer means with the output of the saturable core transformer means to provide the desired function from the applied alternating current signal.

Where a unidirectional voltage output signal is desired from the function generator additional means are provided to rectify and average the foregoing derived alternating current output signal.

Figure 2:
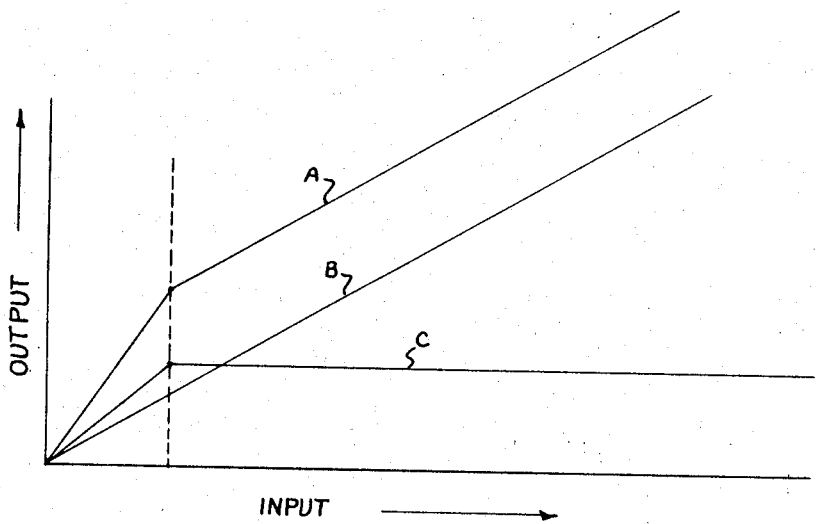

The novel features believed characteristic of the invention are pointed out with particularity in the appended claims. The invention itself, however, both as to its organization and method of operation together with further objects and advantages thereof may best be understood by reference to the following description taken in conjunction with the accompanying drawing wherein:

FIG. 1 is a schematic circuit diagram of a function generator in accordance with one embodiment of the invention; and FIG. 2 is an output characteristic curve of the function generator of FIG. 1.

Referring now to the drawing, there is shown a schematic circuit diagram of a function generator in accordance with this invention comprising the combination of a linear transformer means 10 and a saturable core transformer means 20. The different transformer means 10 and 20 are arranged to be energized by an alternating current signal applied at the input means 22 to provide a desired output made up of the sum of the outputs of the linear transformer means 10 and saturable core transformer means 20. In the arrangement illustrated where a unidirectional voltage output signal is desired, the output of the linear transformer 10 and saturable core transformer 20 are summed, rectified and the average value thereof extracted to provide the desired output at output means 24.

As shown, linear transformer means 10 includes a primary or input winding 28, to which input means 22 is coupled, and secondary or output windings 30 and 32. Saturable core transformer means 20 includes primary, or input, winding 34 and secondary, or output, windings 36 and 37. The alternating current signal is require to energize the input windings of both the transformer means 10 and 20 and this is conveniently accomplished in the arrangement shown by coupling the input signal at input means 22 to the input winding 34 of saturable core transformer means 20 by means of secondary winding 30. To this end, secondary winding 30 of linear transformer means 10 is connected in series circuit with input winding 34 of saturable core transformer means 20. To prevent excessive loading of linear transformer means 10 upon saturation of saturable core transformer means 20, suitable resistance, shown schematically by resistances 40 and 41, is provided in series circuit with windings 30 and 34. To assure fail-safe operation, this resistance is preferably provided by suitable selection of the conductor for the windings 30 and 34. That is, the desired resistance is provided by the winding itself. Conveniently, secondary winding 30 is wound of suitable resistance wire so that the resistance can not be shorted-out without resulting in a decrease in the output of the function generator. For example, any failure in the form of shorted primary turns on saturable core transformer means 20 causes loading of the resistance wire secondary winding 30 of transformer means 10 resulting in a lower output voltage which is in the "fail-safe" direction.

One terminal 44 of linear transformer secondary winding 32 is connected through secondary winding 36 of saturable core transformer means 20, back-to-back connected rectifier devices 46 and 47, secondary winding 37 and to the other terminal 48 of secondary winding 32. A center tap 50 on secondary winding 32 is connected to a suitable point of reference potential, shown as ground.

The function generator is further shown as including a filter means 52, having an inductance 54 and a capacitance 56 connected in series combination between the junction 58, between the rectifier devices 46 and 47, and the point of reference potential. The output of the function generator is developed across a suitable resistance 60 and appears as a unidirectional voltage signal at output means 24.

In operation, the alternating current signal applied at input means 22 energizes linear transformer means 10 and, through secondary winding 30 and primary winding 34, also energizes saturable core transformer means 20. An output is produced, therefore, in both secondary winding 32 of linear transformer means 10 and secondary windings 36 and 37 of saturable core transformer means 20. Because of the series-aiding relationship of these windings the output voltages of the linear transformer means 10 and the saturable core transformer means 20 are summed and the resulting voltage is rectified by rectifier devices 46 and 47; the average value being extracted by L/C filter means 52 to provide the desired unidirectional voltage output signal at output means 24.

Referring now to FIGURE 2, it will be observed that the output signal A at output means 24 is the sum of two signals. One signal B is produced by linear transformer means 10 and is a linear function of the signal applied at the input. The other signal C is produced by the saturable core transformer means 20 and is made up of a first portion which is a linear function of the input before saturation occurs and a second portion which is substantially constant after saturation is reached. Saturable core transformer 20 is provided with a low ratio of resistance to reactance and with low core losses in order to obtain as constant an output as possible after saturation.

The foregoing described function generator has an inherently "fail-safe" mode of operation since any open circuit will reduce the output which when employed with a vehicle control system results in a reduction in the allowable speed at any range. Short circuit conditions also reduce output (and thus allowable speed at any range). For example, the linear transformer means 10 and saturable core transformer means 20 may both be provided step-up so that any primary to secondary short circuit reduces the alternating current signal (and hence the allowable speed at any range). Also, shorted primary turns on linear transformer means 10 will load the driving source resulting in lower output voltage. Similarly, shorted primary turns on saturable core transformer 20 will load the resistance wire secondary 30 of linear transformer means 10 resulting in lower output voltage.

While only a preferred embodiment of the invention has been described in detail herein by way of illustration, many changes and modifications will occur to those skilled in the art. It is to be understood, therefore, that the appended claims are intended to cover all such changes and modifications as fall within the true spirit and scope of this invention.

What we claim as new and desire to secure by Letters Patent of the United States is:

1. An electrical function generator comprising:
   (a) input and output means, said input means being adapted for connection to a source of A-C potential;
   (b) a linear transformer means having input and output windings;
   (c) a saturable core transformer means having input and output windings;
   (d) means coupled to said input means to cause energization of the input windings of both said linear transformer means and said saturable core transformer means with an alternating current signal having a magnitude directly related to the magnitude of the A-C potential applied to said input means operative to produce voltages at the output windings of both of said transformer means; and
   (e) means for summing the voltage at the output winding of said linear transformer means with the voltage at the output winding of said saturable core transformer means to provide a voltage signal at said output means which is a desired function of the alternating current signal applied at said input means.

2. The function generator of claim 1 including additional means for rectifying and averaging the voltage signal at said output means.

3. The function generator of claim 1 including means operatively associated with said linear and saturable core transformer means for preventing said linear transformer means from being excessively loaded when said saturable core transformer means is saturated.

4. The function generator of claim 1 wherein said means for causing energization of the input windings of both said linear and saturable core transformer means comprises an additional output winding on said linear transformer means connected in series circuit relationship with the input winding of said saturable core transformer means so that the signal applied to said input means is coupled through said linear transformer means to the input winding of said saturable core transformer means.

5. The function generator of claim 4 including resistance means in series circuit with the input winding of said saturable core transformer means and said additional output winding of said linear transformer means.

6. The function generator of claim 5 wherein said resistance means is provided by said additional output winding itself.

7. An electrical function generator for producing at its output means a control trajectory function from an alternating current signal applied at the input means thereof comprising:
   (a) a linear transformer means having a primary winding and first and second secondary windings, said transformer means being operative to produce a voltage at said first and second secondary windings which is a linear function of the signal applied to said primary winding;
   (b) a saturable core transformer means having a primary winding and first and second secondary windings, said saturable core transformer means being operative to produce a voltage at said first and second secondary windings thereof which is a linear function of the signal applied at the primary winding thereof before saturation and a constant value after saturation;
   (c) means including resistance for coupling the voltage produced in the first secondary winding of said linear transformer means to the primary winding of said saturable core transformer means;
   (d) means interconnecting the second secondary winding of said linear transformer means in series-aiding relationship with the first and second secondary windings of said saturable core transformer means to provide an alternating current voltage which is the sum of the voltages produced at the secondary windings so interconnected; and (e) means including rectifier means and filter means for extracting at said output means a unidirectional voltage signal which represents the average value of the alternating current voltage provided by said series-aiding secondary windings.

8. The function generator of claim 7 wherein the resistance included in the means for coupling the voltage produced in the first secondary winding of said linear transformer means to the primary winding of said saturable core transformer means is due to the resistance of the first secondary winding itself.

9. The function generator of claim 7 wherein a pair of back-to-back rectifier devices are connected in series circuit between the first and second secondary windings of said saturable core transformer means to provide said rectifier means.

10. The function generator of claim 7 wherein both said linear transformer means and said saturable core transformer means are step-up type.

References Cited

UNITED STATES PATENTS

| | | | |
|---|---|---|---|
| 2,842,733 | 7/1958 | Lilienstein | 323—66 |
| 2,886,768 | 5/1959 | Minder | 323—66 |
| 2,908,864 | 10/1959 | Shepard | 321—16 XR |
| 2,978,628 | 4/1961 | Diebold | 321—16 |

JOHN F. COUCH, *Primary Examiner.*

W. M. SHOOP, JR., *Assistant Examiner.*

U.S. Cl. X.R.

235—197; 307—229; 321—25; 323—66